United States Patent
Minami

(10) Patent No.: US 11,694,126 B2
(45) Date of Patent: Jul. 4, 2023

(54) INFORMATION PROCESSING APPARATUS AND RECORDING MEDIUM

(71) Applicant: Konica Minolta, Inc., Tokyo (JP)

(72) Inventor: Hirotake Minami, Fuchu (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/505,249

(22) Filed: Oct. 19, 2021

(65) Prior Publication Data

US 2022/0036551 A1 Feb. 3, 2022

Related U.S. Application Data

(63) Continuation of application No. 16/596,402, filed on Oct. 8, 2019, now Pat. No. 11,176,664.

(30) Foreign Application Priority Data

Oct. 18, 2018 (JP) .................................. 2018-196330

(51) Int. Cl.

| G06N 20/20 | (2019.01) |
| G06T 7/00 | (2017.01) |
| G06N 20/00 | (2019.01) |
| G06V 10/778 | (2022.01) |
| G06V 10/94 | (2022.01) |

(52) U.S. Cl.
CPC ............. *G06N 20/20* (2019.01); *G06N 20/00* (2019.01); *G06T 7/0012* (2013.01); *G06V 10/7784* (2022.01); *G06V 10/7788* (2022.01); *G06V 10/945* (2022.01); *G06T 2207/20081* (2013.01)

(58) Field of Classification Search
CPC ........ G06N 20/00; G06N 20/10; G06N 20/20; G06N 5/003; G06N 3/0472; G06N 3/084; G06N 5/048; G06N 7/005; G06T 2207/20081; G06T 7/0012
USPC ......................................................... 382/155
See application file for complete search history.

(56) References Cited

U.S. PATENT DOCUMENTS

| 2015/0370478 | A1 | 12/2015 | Okajima et al. |
| 2016/0026900 | A1* | 1/2016 | Ando ..................... G06V 10/50 382/159 |
| 2019/0065995 | A1 | 2/2019 | Takayama et al. |
| 2020/0218980 | A1* | 7/2020 | Matsumoto .............. A61B 1/00 |

FOREIGN PATENT DOCUMENTS

JP 2015-087903 A 5/2015

\* cited by examiner

*Primary Examiner* — Ajibola A Akinyemi
(74) *Attorney, Agent, or Firm* — Lucas & Mercanti, LLP

(57) ABSTRACT

An information processing apparatus includes a hardware processor which (i) performs learning by a learning data set associated with a correct answer label for a preset problem and creates a machine learning model for estimating a correct answer to the preset problem for input data, (ii) estimates the correct answer to the preset problem for the input data by using the machine learning model, (iii) in response to a user operation, determines a label indicating a result of the estimation as a correct answer label of the input data or corrects the label to determine the corrected label as a correct answer label of the input data, and (iv) additionally registers the determined correct answer label as learning data in association with the input data in the learning data set.

7 Claims, 4 Drawing Sheets

| PROBLEM SETTING | MACHINE LEARNING MODEL | EXTRACTION TENDENCY |
|---|---|---|
| ■ REGION RECOGNITION | ■ Deep Learning | ☐ OVEREXTRACTION |
| ☐ IDENTIFICATION |   ☐ AlexNet | ☐ INSUFFICIENT EXTRACTION |
| ☐ DETECTION |   ☐ GoogleNet | ■ NO DESIGNATION |
| ☐ PREDICTION |   ☐ ResNet | |
| |   ■ U-Net | |
| |   ☐ DenseNet | |
| |   ☐ SegNet | |
| |   ⋮ | |
| | ☐ RandomForest | |
| | ☐ SVM | |
| | ⋮ | |

151

FIRST : INITIAL PERIOD     SECOND     N-TH

INFORMATION PROCESSING APPARATUS AND RECORDING MEDIUM

This application is a continuation of U.S. patent application Ser. No. 16/596,402 filed Oct. 8, 2019, which in turn claims priority of Japanese Patent Application No. 2018-196330 filed Oct. 18, 2018, the entire disclosure of both applications is incorporated herein by reference in its entirety.

BACKGROUND

1. Technological Field

The present invention relates to an information processing apparatus and a recording medium storing a computer readable program.

2. Description of the Related Art

In recent years, there have been attempts to use machine learning (AI) for supporting diagnosis in medical fields. In the machine learning, by using a large amount of data, a machine is allowed to learn data patterns and correlations and perform identification, recognition, detection, prediction, and the like. In order to create a machine learning model (discriminator) with a high accuracy by the machine learning, the amount of learning data used for the learning and the quality of correct answer labels corresponding to the learning data are important.

Therefore, for example, JP 2015-87903 A proposes a technique for improving the quality of labels used for the learning by preparing first and second data sets that are sets of combinations of data and correct answer labels and updating data sets while alternately replacing a data set used as a teacher set and a data set used as an evaluation set.

In JP 2015-87903 A, it is necessary to prepare the first and second data sets that are sets of combinations of data and correct answer labels in advance. However, the creation of the correct answer labels for a large amount of data involves a great deal of time and effort, and in recent machine learning, particularly, reduction of the cost of creating the correct answer labels has become an important issue. The creation of the correct answer labels used for learning for performing region recognition (segmentation) for image data requires a user to specify a region along detailed contour of the region, which is cumbersome and requires a lot of effort.

SUMMARY

The invention is to enable efficient creation of a correct answer label for learning data used for machine learning.

To achieve at least one of the abovementioned objects, according to an aspect of the present invention, an information processing apparatus includes a hardware processor which:

performs learning by a learning data set associated with a correct answer label for a preset problem and creates a machine learning model for estimating a correct answer to the preset problem for input data;

estimates the correct answer to the preset problem for the input data by using the machine learning model;

in response to a user operation, determines a label indicating a result of the estimation as a correct answer label of the input data or corrects the label to determine the corrected label as a correct answer label of the input data;

additionally registers the determined correct answer label as learning data in association with the input data in the learning data set; and performs controlling so as to repeatedly execute:
  creation of a machine learning model using the learning data set including the additionally registered learning data;
  estimation of the correct answer for the input data using the created machine learning model;
  determination of the label indicating the result of the estimation as the correct answer label, or correction of the label and determination of the label as the correct answer label; and
  registration of the input data with the correct answer label determined in the learning data set.

According to another aspect of the present invention, a non-transitory recording medium stores a computer readable program that causes a computer to function as:

a learning unit which performs learning by a learning data set associated with a correct answer label for a preset problem and which creates a machine learning model for estimating a correct answer to the preset problem for input data;

an estimator which estimates the correct answer to the preset problem for the input data by using the machine learning model learned by the learning unit;

a label determinator which, in response to a user operation, determines a label indicating an estimation result by the estimator as a correct answer label of the input data or corrects the label to determine the corrected label as a correct answer label of the input data;

a registrator which additionally registers the determined correct answer label as learning data in association with the input data in the learning data set; and a hardware processor which performs controlling so as to repeatedly execute:
  creation of a machine learning model by the learning unit using the learning data set including the learning data additionally registered by the registrator;
  estimation of the correct answer for the input data using the created machine learning model by the estimator;
  determination of the label indicating the estimation result by the estimator as the correct answer label or correction of the label and determination of the label as the correct answer label by the determinator; and
  registration of the input data with the correct answer label determined in the learning data set by the registrator.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, embodiments of the invention will be described with reference to the drawings. However, the scope of the invention is not limited to the illustrated examples.

Configuration of Information Processing Apparatus 1

First, a configuration of an information processing apparatus 1 according to the invention will be described.

The information processing apparatus 1 is an apparatus for performing creation of correct answer labels for data (learning data) used for machine learning, creation of a machine learning model by learning using a learning data set including a plurality of the learning data, estimation of a correct answer by using the machine learning model for input data (unknown data not associated with the correct answer label), and the like. In the information processing apparatus 1, the data handled by the machine learning is not particularly limited, and various data such as images, audios, and documents can be used. However, in this embodiment, a case where a medical image is used will be described as an example.

Figure 1A:
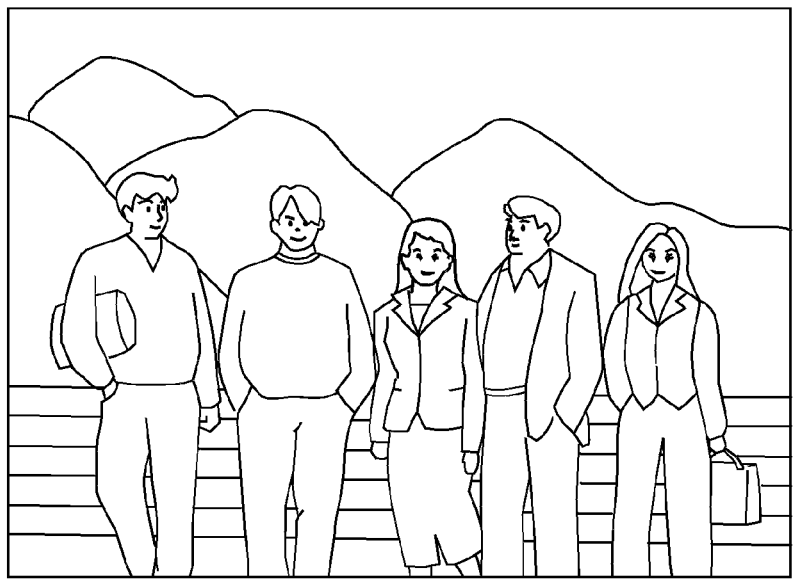
FIG. 1A is a diagram illustrating an example of learning data.
Figure 1B:
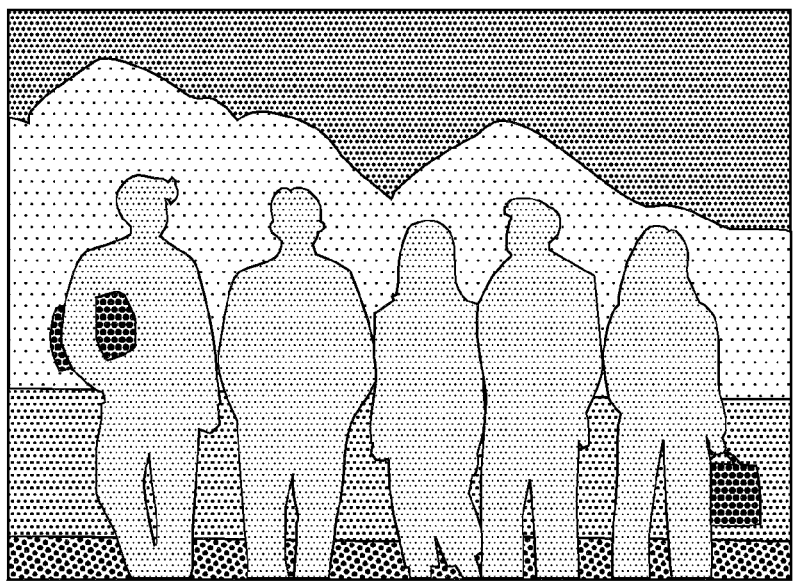
FIG. 1B is a diagram illustrating a correct answer label in FIG. 1A in a case where problem setting of machine learning is region recognition.

The correct answer label is information indicating a correct answer of a problem (identification, recognition, detection, prediction, and the like) processed by the machine learning. FIG. 1A is a diagram illustrating an example of the learning data, and FIG. 1B is a diagram illustrating the correct answer labels corresponding to the learning data in FIG. 1A in a case where the problem to be learned by machine learning is region recognition. Each region classified with color in FIG. 1B is associated with information indicating what region the region is.

Figure 2:
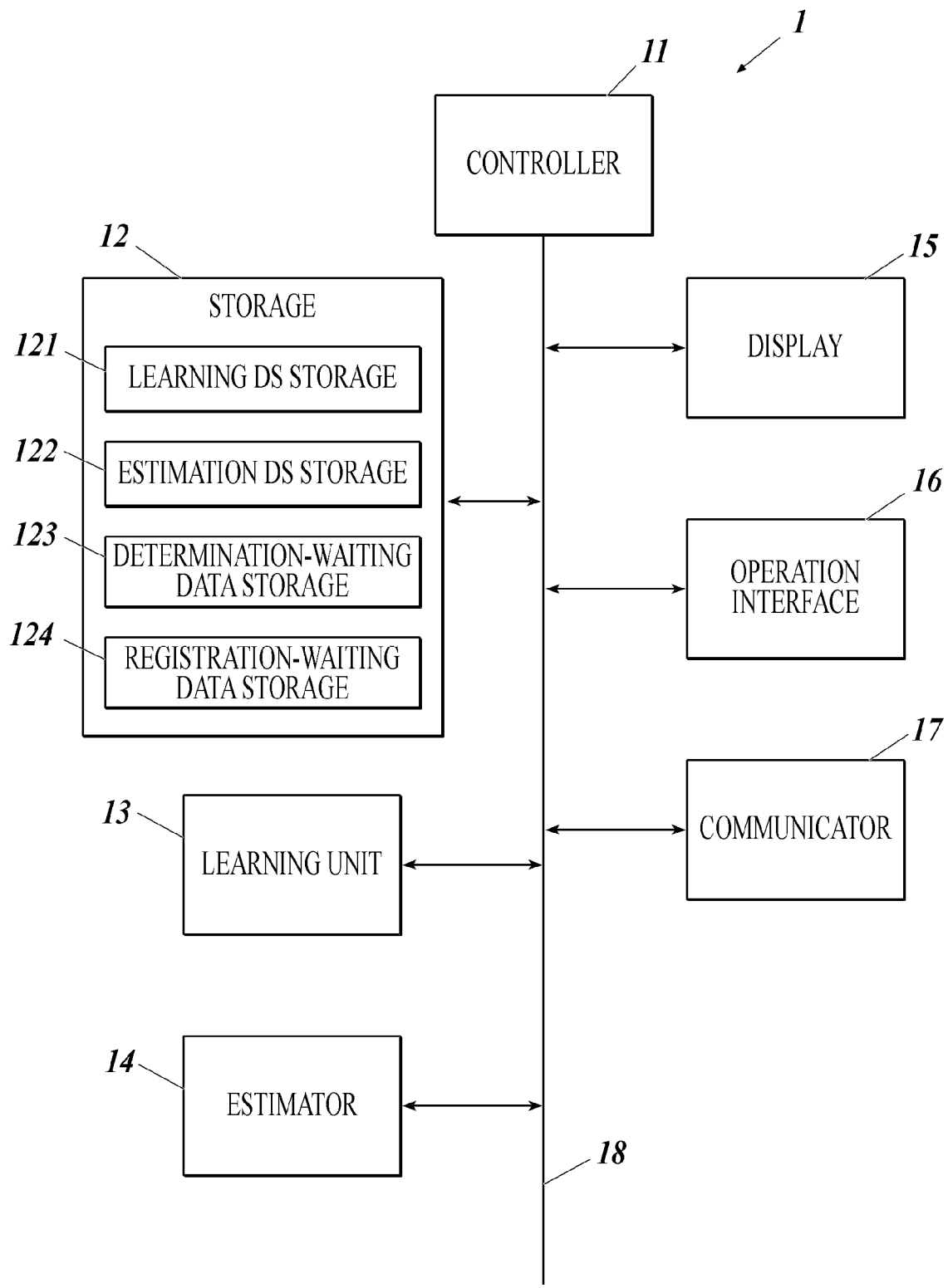
FIG. 2 is a block diagram illustrating a functional configuration of an information processing apparatus according to an embodiment of the invention.

FIG. 2 is a block diagram illustrating a functional configuration of the information processing apparatus 1 according to a first embodiment. As illustrated in FIG. 2, the information processing apparatus 1 includes a controller (hardware processor) 11, a storage 12, a learning unit 13, an estimator 14, a display 15, an operation interface 16, a communicator 17, and the like, and these components are connected via a bus 18.

The controller 11 includes a central processing unit (CPU), a random access memory (RAM), and the like. The CPU of the controller 11 reads out a system program and various processing programs stored in the storage 12 in response to the operation of the operation interface 16, expands the system program and the processing programs in the RAM, and performs centralized control of operations of components of the information processing apparatus 1.

The storage 12 is configured with a nonvolatile semiconductor memory, a hard disk, or the like. The storage 12 stores system programs and various programs executed by the controller 11 and data such as parameters necessary for execution of processing by the programs. For example, the storage 12 stores a program for executing a label creation program described later or the like. Various programs are stored in a form of readable program codes, and the controller 11 sequentially executes operations according to the program codes.

The storage 12 includes a learning data set (DS) storage 121, an estimation DS storage 122, a determination-waiting data storage 123, and a registration-waiting data storage 124.

The learning DS storage 121 stores a learning data set used for machine learning in the learning unit 13.

Figure 3:
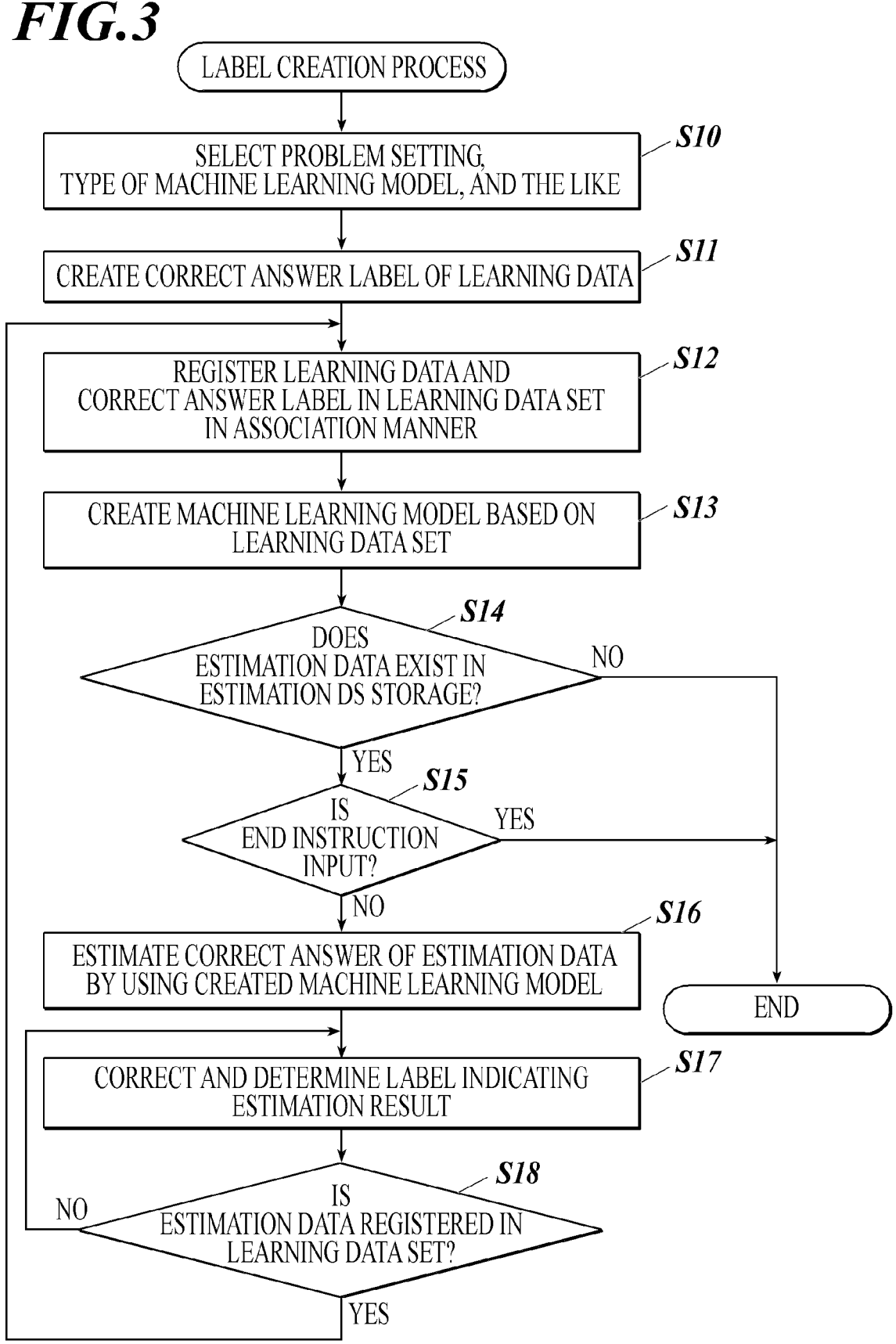
FIG. 3 is a flowchart illustrating a label creation process to be executed by a controller of FIG. 2.

In order to create a machine learning model with a high accuracy by the machine learning, a learning data set including a large amount of the learning data is required, but a learning data set of an initial stage (before the start of the label creation process illustrated in FIG. 3) does not necessarily include the learning data of which the amount is necessary for creating the machine learning model with a required accuracy but may store only a small amount of the learning data as a portion of the learning data. In the initial stage, the learning data associated with the correct answer label may be stored in the learning DS storage 121, or the learning data not associated with the correct answer label may be stored in the learning DS storage 121.

The estimation DS storage 122 stores unknown data (referred to as estimation data) that is to be estimated by the estimator 14 in the label creation process illustrated in FIG. 3 and is not associated with the correct answer label.

Before the start of the label creation process illustrated in FIG. 3, a large amount of the estimation data set is stored in the estimation DS storage 122, and the estimator 14 estimates the correct answer of the estimation data in the label creation process. When the label indicating the estimation result is determined as a correct answer label, the determined correct answer label is associated with the estimation data and registered in the learning DS storage 121 as learning data.

The determination-waiting data storage 123 is a region for temporarily storing estimation data and a label waiting for determination in a label creation process to be described later.

The registration-waiting data storage 124 is a region for temporarily storing the estimation data waiting for registration in the learning DS storage 121 and the corresponding correct answer label.

The learning unit 13 performs learning by using the learning data set, creates the machine learning model for estimating the correct answer to the preset problem for the data input in the estimator 14, and outputs the machine learning model to the estimator 14. The learning unit 13 is realized by cooperation of the CPU of the controller 11 and various learning programs stored in the learning unit 13 but may be configured by dedicated hardware.

The estimator 14 estimates the correct answer to the preset problem for the input data by using the machine learning model generated by the learning unit 13. In the label creation process, the estimator 14 estimates the correct answer of the estimation data by using the estimation data stored in the estimation DS storage 122 as the input data. The estimator 14 is realized by cooperation of the CPU of the controller 11 and the machine learning model but may be configured by dedicated hardware.

The display 15 is configured with a monitor such as a liquid crystal display (LCD) or a cathode ray tube (CRT) and displays an input instruction, data, or the like from the operation interface 16 in accordance with an instruction of a display signal input from the controller 11.

The operation interface 16 is configured to include a keyboard having a cursor key, numeric input keys, various function keys, and the like and a pointing device such as a mouse and outputs an instruction signal input by key operations of the keyboard or mouse operations by the user to the controller 11. The operation interface 16 may include a touch panel on a display screen of the display 15, and in this case, the operation interface 16 outputs an instruction signal input via the touch panel to the controller 11.

The communicator 17 includes a LAN adapter, a modem, a terminal adapter (TA), and the like and controls data transmission/reception with an external apparatus connected to a communication network.

Operations of Information Processing Apparatus 1

Next, operations of the information processing apparatus 1 in this embodiment will be described.

FIG. 3 illustrates a flowchart of the label creation process to be executed in the controller 11 of the imaging console 2. The label creation process is executed in cooperation with the controller 11 and a program stored in the storage 12.

Figures 4, 5:
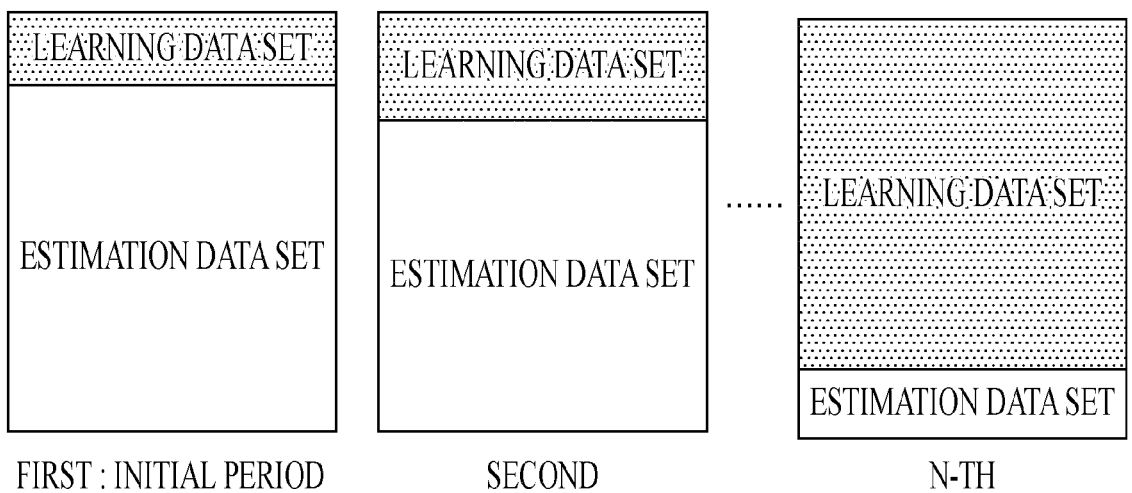
FIG. 4 is a diagram illustrating an example of a selection screen.
FIG. 5 is a diagram schematically illustrating changes in amounts of a learning data set and an estimation data set by repeatedly executing steps S12 to S18 of FIG. 3.

First, the controller 11 displays a selection screen 151 illustrated in FIG. 4 on the display 15 and receives selection of problem setting of machine learning (problems to be processed by machine learning) by the operation interface 16, a type of the machine learning model to be created, and extraction tendency or the like in a case where the problem setting is region recognition (step S10).

As options of the problem setting of the machine learning, there may be exemplified region recognition, identification, detection, prediction, and the like. In a case where the data to be processed is a medical image, in the region recognition, for example, a structure region (lung field, heart, bone, and the like) or a lesion region is recognized. In the identification, for example, an imaging region (head, chest, abdomen, and the like) is identified. In the detection, for example, a specific region, and a lesion are detected. In the prediction, for example, life expectancy, illness, and the like are predicted.

As options for the type of machine learning model, there may be exemplified various network models (for example, AlexNet, GoogleNet, ResNet, and the like) for deep learning, RandomForest, support vector machine (SVM), and the like.

As options of the extraction tendency, there may be exemplified overextraction, insufficient extraction, no designation, and the like.

Next, the controller 11 creates a correct answer label of the learning data stored in the learning DS storage 121 (step S11).

In step S11, creation of the correct answer label is performed for the learning data that are stored in the learning DS storage 121 but not associated with correct answer labels. For the learning data associated with the correct answer label, the creation of the correct answer label is not performed. The creation of the correct answer label may be performed for the entire medical image or for a portion of the medical image.

In step S11, at the time of creating the correct answer label for the learning data that is not associated with the correct answer label, the learning data may be displayed on the display 15 to create the correct answer label in response to the user operation. However, for example, in a case where the problem setting is region recognition, the creation of the correct answer label by the user operation requires operations such as visually recognizing the region of an object (structure or lesion) in the image, specifying (painting with a predetermined color or the like) the recognized region with a mouse or the like, and allocating information indicating what region each region is, so that effort and time are taken. In addition, for example, the edge of a lesion in a medical image may be difficult to recognize, and thus, there is a possibility that a difference in recognition occurs among doctors. Therefore, preferably, a label creation assistance algorithm (program) is stored in the storage 12, and the controller 11 creates the correct answer label by using the algorithm stored in the storage 12 on the basis of an instruction from the operation interface 16.

As the label creation assistance algorithm, for example, an algorithm for creating a label by performing a time-lapse difference process on a plurality of medical images obtained by imaging the same subject at different times can be used. For example, in the algorithm, by performing the time-lapse difference process using medical images of the same subject as the learning data for which the correct answer label is to be created when there is no lesion, the region of the lesion of the learning data for which the correct answer label is to be created is automatically recognized, so that the correct answer label can be created.

In addition, for example, an algorithm for creating a correct answer label for arbitrary one frame by a user operation in a moving image obtained by continuously imaging the same subject a plurality of times and applying a warping process to the correct answer label created for one frame among other frames to create a region label of another frame image may be used as the label creation assistance algorithm.

Besides, a region recognition algorithm such as binarization processing and threshold processing of discrimination analysis and the like may be used as the label creation assistance algorithm.

The correct answer label may be automatically created on the basis of report information indicating a lesion position or the like determined by a doctor.

The controller 11 registers the learning data and the correct answer label created for the learning data in the learning DS storage 121 in association with each other (step S12).

The controller 11 allows the learning unit 13 to perform learning on the basis of the learning data set registered in the learning DS storage 121 and to create the machine learning model for estimating the correct answer to the problem selected in step S10 for the data input in the estimator 14 (step S13).

The controller 11 determines whether there is estimation data in the estimation DS storage 122 (step S14).

If it is determined that the estimation data exists in the estimation DS storage 122 (step S14; YES), the controller 11 determines whether or not an end instruction is input by the operation interface 16 (step S15).

If it is determined that an end instruction is not input by the operation interface 16 (step S15; NO), the controller 11 allows the estimator 14 to sequentially perform the estimation of the correct answer by using the machine learning model created in step S13 and setting the estimation data stored in the estimation DS storage 122 as the input data and to store the label indicating the estimation result in the determination-waiting data storage 123 in association with the estimation data (step S16). The estimation data after completion of the estimation is deleted from the estimation DS storage 122.

When the estimation data associated with the label is stored in the determination-waiting data storage 123, the controller 11 displays the estimation data and the label indicating the estimation result on the display 15 and receives a determination instruction as a correct answer label of the label indicating the estimation result by the operation interface 16, or a correction instruction of the label indicating the estimation result and a determination instruction as the correct answer label (step S17).

The user checks the estimation data and the label displayed on the display 15, and in a case where the label indicating the estimation result is a correct answer, the user inputs a determination instruction through the operation interface 16. In a case where the label indicating the estimation result is incorrect, after correcting the label through the operation interface 16, the user inputs the determination instruction. In a case where the set problem is region recognition, by selecting overextraction or insufficient extraction as an extraction tendency in response to user's preference (whether to prefer the correction to narrow (erase) the region or the correction to widen (fill) the region), the correction of the label can be easily performed. When a determination instruction for the label is input, the controller 11 stores the determined label as a correct answer label in the registration-waiting data storage 124 in association with the estimation data. The determined estimation data is deleted from the determination-waiting data storage 123.

In step S17, at the time of displaying the estimation data stored in the determination-waiting data storage 123 and the label indicating the estimation result on the display 15, the controller 11 displays a tool for the user to perform correction through the operation interface 16 or a determination button for performing a determination instruction and displays a skip button for skipping the process for the displayed label. Accordingly, it is possible for the user to postpone the determination that is to take time and effort to perform correction and to perform the determination that is to provide the correct answer at a glance, so that it is possible to effectively perform additional registration to the learning data set and updating of the machine learning model at a later stage.

Next, the controller 11 determines whether or not an instruction for registering the estimation data with the correct answer label determined in the learning DS storage 121 is input by the operation interface 16 (step S18).

If it is determined that the instruction for registering the estimation data with the correct answer label determined in the learning DS storage 121 is not input (step S18; NO), the controller 11 returns to step S17 and receives the instruction for determining the label indicating the estimation result by the estimator 14 as the correct answer label, which is sequentially stored in the determination-waiting data storage 123, or the instruction for correcting the label indicating the estimation result and determining the label as the correct answer label.

If it is determined that the instruction for registering the estimation data with the correct answer label determined in the learning DS storage 121 is input (step S18; YES), the controller 11 returns to step S12 and registers (additionally registers) the estimation data associated with the correct answer label, which is stored in the registration-waiting data storage 124, as the learning data in the learning DS storage 121 and deletes the estimation data from the registration-waiting data storage 124. Then, the controller 11 allows the learning unit 13 to perform learning on the basis of the learning data set including the additionally registered learning data and to create the machine learning model for estimating the correct answer to the preset problem for the data input in the estimator 14.

The controller 11 repeatedly executes the processes of steps S12 to S18 until it is determined in step S14 that there is no estimation data in the estimation DS storage 122 or an end instruction for the label creation is input by the operation interface 16. In a case where it is determined in step S14 that there is no estimation data in the estimation DS storage 122 (that is, all the estimation data stored in the estimation DS storage 122 are associated with the correct answer labels) (step S14; NO), or in a case where an end instruction of the label creation is input by the operation interface 16 (step S15; YES), the controller 11 ends the label creation process.

The machine learning model created by the label creation process is input to the estimator 14 and used to estimate the correct answer for unknown data.

As described above, in the label creation process according to this embodiment, the controller 11 repeatedly executes:

the creation of the machine learning model using the learning data set by the learning unit 13;

the estimation of the correct answer of unknown estimation data using the created machine learning model by the estimator 14;

the determination (correction and determination) of the label indicating the estimation result as the correct answer label by the user; and the additional registration of the estimation data associated with the correct answer label determined in the learning data set (steps S12 to S18).

As the processes in steps S12 to S18 are repeated, the amount of the learning data set increases as illustrated in FIG. 5.

Therefore, if a small amount of the learning data associated with the correct answer label is prepared as the initial learning data, since the learning data associated with the correct answer label can be created by the user simply determining the estimation result estimated by the machine learning model as the correct answer label as it is or determining as the correct answer label after making slight corrections for the data that is not associated with the correct answer label, it is possible to efficiently perform the creation of the correct answer label using the machine learning. In particular, the creation of the correct answer labels such as region recognition for image data is cumbersome and requires a lot of effort, but the number of man-hours can be greatly reduced. As the process is repeated, the amount of the learning data set used for the machine learning increases, and the estimation accuracy for the estimation data by the machine learning model improves, so that the times of the correction of the estimation result of the machine learning by the user decreases, and thus, it is possible to more efficiently perform the creation of the correct answer label.

Since the problem to be processed by the machine learning model can be selected from a plurality of options, it is possible to efficiently create the correct answer label for the problem desired by the user. Since the user can select the type of the machine learning model to be applied to the problem processing, it is possible to create the correct answer label with the machine learning model desired by the user.

Since the algorithm that assists in creating the correct answer label for the learning data that is not associated with the correct answer label is provided to automatically or semi-automatically create the correct answer label, it is possible to reduce the effort of manually creating the correct answer label by the user operating the operation interface 16.

The description content in the above-described embodiment is a suitable example of the invention, and the invention is not limited to this.

For example, in the above-described embodiment, the label creation process illustrated in FIG. 3 is performed for the purpose of efficiently acquiring the learning data associated with the correct answer label, but the label creation process illustrated in FIG. 3 may be performed for the purpose of creating the machine learning model with a high accuracy.

For example, in the above description, the example where a hard disk, a semiconductor nonvolatile memory, or the like is used as the computer-readable medium of the program according to the invention is disclosed, but the invention is not limited to this example. As another computer-readable medium, a portable recording medium such as a CD-ROM can be applied. A carrier wave is also applied as a medium for providing data of program according to the invention via a communication line.

The detailed configurations and detailed operations of each device constituting the information processing apparatus can also be changed as appropriate without departing from the spirit of the invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. A label creation assistance apparatus that creates a correct answer label for learning data, wherein
    in a case where (i) learning data that is not associated with the correct answer label is a group of images obtained by imaging a same subject a plurality of times and (ii) the correct answer label of at least a first image in the group is created the label creation assistance apparatus creates the correct answer label of a second image in the group based on the correct answer label of the first image,
    wherein the label creation assistance apparatus performs a warping process on the correct answer label of the first image to create the correct answer label of the second image,
    the images are obtained by imaging the same subject at different times, and
    the label creation assistance apparatus performs a time lapse difference process using medical images of the same subject as the learning data for which the correct answer label is to be created when there is no lesion, and the region of the lesion of the learning data for which the correct answer label is to be created is automatically recognized.

2. The label creation assistance apparatus according to claim 1, wherein the correct answer label of the first image is automatically created based on report information indicating at least a lesion position determined by a doctor.

3. The label creation assistance apparatus according to claim 1, wherein the images are moving images.

4. The label creation assistance apparatus according to claim 1, wherein the images are medical images.

5. The label creation assistance apparatus according to claim 1, wherein, when the images are frames of a moving image, the warping process is applied to the correct answer label of the first image to create the correct answer label for the second image.

6. The label creation assistance apparatus according to claim 1, wherein the label creation assistance apparatus creates a machine learning model based on a learning data set, the correct answer label of the second image is registered in the learning data set based on a user input, and the machine learning model is created based on the learning data set including the correct answer label of the second image.

7. A non-transitory recording medium storing a computer readable program that causes a computer of a label creation assistance apparatus to create a correct answer label for learning data, wherein
    in a case where (i) learning data that is not associated with the correct answer label is a group of images obtained by imaging a same subject a plurality of times and (ii) the correct answer label of at least a first image in the group is created, the program causes the computer to create the correct answer label of a second image in the group based on the correct answer label of the first image,
    wherein the label creation assistance apparatus performs a warping process on the correct answer label of the first image to create the correct answer label of the second image,
    the images are obtained by imaging the same subject at different times, and
    the label creation assistance apparatus performs a time lapse difference process using medical images of the same subject as the learning data for which the correct answer label is to be created when there is no lesion, and the region of the lesion of the learning data for which the correct answer label is to be created is automatically recognized.

* * * * *